US010127252B2

(12) United States Patent
Diehl

(10) Patent No.: US 10,127,252 B2
(45) Date of Patent: Nov. 13, 2018

(54) HISTORY AND SCENARIO DATA TRACKING

(71) Applicant: ORACLE INTERNATIONAL CORPORATION, Redwood Shores, CA (US)

(72) Inventor: Brian Kelly Diehl, Mooresville, NC (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 580 days.

(21) Appl. No.: 14/710,771

(22) Filed: May 13, 2015

(65) Prior Publication Data

US 2016/0283890 A1    Sep. 29, 2016

Related U.S. Application Data

(60) Provisional application No. 62/136,792, filed on Mar. 23, 2015.

(51) Int. Cl.
G06F 17/30    (2006.01)
G06Q 10/06    (2012.01)

(52) U.S. Cl.
CPC .. *G06F 17/30309* (2013.01); *G06F 17/30339* (2013.01); *G06F 17/30368* (2013.01); *G06F 17/30528* (2013.01); *G06F 17/30548* (2013.01); *G06F 17/30575* (2013.01); *G06Q 10/063114* (2013.01)

(58) Field of Classification Search
CPC .............................................. G06F 17/30309
See application file for complete search history.

(56) References Cited

U.S. PATENT DOCUMENTS

| | | | |
|---|---|---|---|
| 6,978,281 B1 | 12/2005 | Kruy et al. | |
| 7,113,915 B1 | 9/2006 | Montemayer et al. | |
| 7,334,094 B2 * | 2/2008 | Fair | G06F 17/30067 707/E17.01 |
| 7,395,258 B2 * | 7/2008 | Altinel | G06F 17/3048 |
| 7,908,167 B1 | 3/2011 | Crum et al. | |

(Continued)

OTHER PUBLICATIONS

"How to Use the New Baselines View—LiquidPlanner", downloaded Feb. 2, 2015 from: http://www.liquidplanner.com/blog/how-to-use-the-new-baseline-view-for-snapshots-and-comparative-data/; pp. 1-18.

(Continued)

*Primary Examiner* — Syed H Hasan
(74) *Attorney, Agent, or Firm* — Kraguljac Law Group LLC

(57) ABSTRACT

Systems, methods, and other embodiments associated with history and scenario data tracking are described. In one embodiment, a method includes recording, in an overlay table, a scenario comprising a set of respective modified records resulting from respective operations performed on respective selected records in project data, such that the selected records remain unmodified in the project data. In response to a request for the project data as modified by the scenario, the method includes combining records in the project data with the modified records in the overlay table to create a scenario result, such that the selected records are not included in the scenario result.

20 Claims, 8 Drawing Sheets

(56) References Cited

U.S. PATENT DOCUMENTS

| | | | |
|---|---|---|---|
| 7,925,527 B1 | 4/2011 | Flam | |
| 8,005,705 B2 | 8/2011 | Gura et al. | |
| 8,489,440 B2 | 7/2013 | Salwitz et al. | |
| 2003/0229524 A1 | 12/2003 | Reuveni | |
| 2007/0130226 A1* | 6/2007 | Banerjee | G06F 17/30306 |
| 2007/0271185 A1 | 11/2007 | Engler | |
| 2008/0183973 A1* | 7/2008 | Aguilera | G06F 11/1464 |
| | | | 711/147 |
| 2010/0153158 A1 | 6/2010 | Wex et al. | |
| 2012/0253876 A1 | 10/2012 | Hersch | |
| 2013/0086521 A1 | 4/2013 | Grossele et al. | |
| 2013/0290219 A1 | 10/2013 | Dubois | |
| 2013/0332487 A1* | 12/2013 | Ramesh | G06F 17/30457 |
| | | | 707/775 |
| 2013/0332660 A1* | 12/2013 | Talagala | G06F 12/0246 |
| | | | 711/103 |
| 2014/0122430 A1 | 5/2014 | Dary | |
| 2014/0283048 A1 | 9/2014 | Howes et al. | |
| 2015/0009804 A1* | 1/2015 | Koponen | H04L 41/0695 |
| | | | 370/219 |
| 2015/0143064 A1* | 5/2015 | Bhargava | G06F 11/1451 |
| | | | 711/162 |
| 2015/0261870 A1* | 9/2015 | Hrle | G06F 17/30457 |
| | | | 707/754 |
| 2016/0077920 A1* | 3/2016 | Regni | G06F 17/30575 |
| | | | 707/649 |
| 2016/0085777 A1* | 3/2016 | Engelko | G06F 17/30292 |
| | | | 707/803 |
| 2017/0052879 A1* | 2/2017 | Chandra | G06F 11/3668 |

OTHER PUBLICATIONS

"Package Baselines", downloaded Feb. 2, 2015 from: http://www.sparxsystems.com/enterprise_architect_user_guide/9.3/projects_and_teams/baselinesanddifferences.html; pp. 1-3.

"Baseline UML Models", downloaded Feb. 2, 2015 from: http://www.sparxsystems.com/downloads/resources/booklets/baseline_uml_models.pdf; pp. 1-15.

"Earned Value Management", downloaded Feb. 2, 2015 from: http://www.evmax.net/en-us/Earned-Value-Management-Software/Earned-Value/evms/EVM.aspx; pp. 1-3.

"Project Management", downloaded Feb. 2, 2015 from: http://www.klusa.com/index.php/en/Project-Management/projectmanagement.html; pp. 1-2.

"Baselines in CA Clarity PPM and Microsoft Project", downloaded Feb. 2, 2015 from: http://cookbooks.ca.com/cacppm/2014/08/12/baselines-in-ca-clarity-ppm-and-microsoft-project/; pp. 1-12.

"SAFRAN Project", downloaded Feb. 2, 2015 from: http://www.leadformix.com/bf/uploads/nlp/lpfiles/lpimg2910/Safran_Project_Brochure_Web.pdf; pp. 1-6.

"Project Time Management", downloaded Jan. 31, 2015 from: http://www.free-management-ebooks.com/faqpm/time-08.htm; pp. 1-6.

"Create or Update a Baseline or an Interim PLan", downloaded Jan. 31, 2015 from: https://support.office.microsoft.com/en-in/article/Create-or-update-a-baseline or an interim-plan-74b5aac6-d3f2-4346-8632-7a226c6de186?CorrelationId=3f5c5814-86ed-4e8f-b8f6-62c1367df5fe&ui=en-US&rs=en-IN&ad=IN; pp. 1-6.

"How do I Baseline a Project or Snapshot a Sales Pipeline", downloaded Feb. 2, 2015 from: http://quickbase.intuit.com/developer/knowledge-base/how-do-i-baseline-project-or-snapshot-sales-pipeline; pp. 1-5.

"Baseline Change Control Procedure", EVMS-P-7, downloaded from: http://www.fnal.gov/directorate/OPMO/Shared/Other%20Lab%20Docs/PNNL/Old/EVMS_P-7_Baseline_Change_Control_Rev_0.pdf; pp. 1-24; Revision 0—Oct. 2006, Pacific Northwest National Laboratory.

Schumacher, et al., "Creating Half-Step Schedules Using P6 Baseline Update", Jun. 30, 2013, downloaded from: http://www.ronwinterconsulting.com/Creating_Half-Step_Schedules_Using_P6.pdf; pp. 1-14.

"ProjStream Project Solutions", 2014, downloaded from: http://www.evmax.net/App_Themes/www_evmax_net/customimages/2014_EVMax-Data-Sheet.pdf; pp. 1-2.

Office Action dated Oct. 4, 2017 for co-pending U.S. Appl. No. 14/714,598, filed May 18, 2015.

Final Office Action in co-pending U.S. Appl. No. 14/714,598, filed May 18, 2015, dated Jun. 15, 2018, (18 pgs).

* cited by examiner

HISTORY AND SCENARIO DATA TRACKING

CROSS REFERENCE TO RELATED APPLICATIONS

This disclosure claims the benefit of U.S. Provisional Patent Application Ser. No. "62/136,792" filed Mar. 23, 2015, titled "History, Trending and Scenario Data Tracking", inventor: Brian Diehl, and assigned to the present assignee.

BACKGROUND

Measuring progress against a baseline is a fundamental aspect of Project Portfolio Management. The baseline corresponds to the project's status at some established point in the past and in some instances the baseline itself is adjusted during the course of the project. Thus, measuring a project's progress against a baseline is a continuous and dynamic process that is often as important as maintaining the baseline itself.

BRIEF DESCRIPTION OF THE DRAWINGS AND EXHIBITS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale.

DETAILED DESCRIPTION

Traditional approaches to tracking project progress capture and store "snapshots" of the entire project. The snapshots are complete copies of all project data including data that is usually hidden from the everyday user of the project portfolio management solution. Each snapshot consumes a large amount of memory, so change management is often accomplished by updating the snapshots when changes occur rather than storing a new snapshot, which results in the loss of original snapshot data. Having a finite set of snapshots limits the granularity with which analysis can be performed.

Systems and methods are described herein that provide project progress management without relying on stored snapshots. Rather than storing snapshots, the systems and methods herein maintain a few project tracking tables and provide an overlay table into which scenario data can be written. The systems and methods herein provide the scenario feature by accessing the overlay table as well as the base table and the tracking tables.

Snapshots

Figure 1:
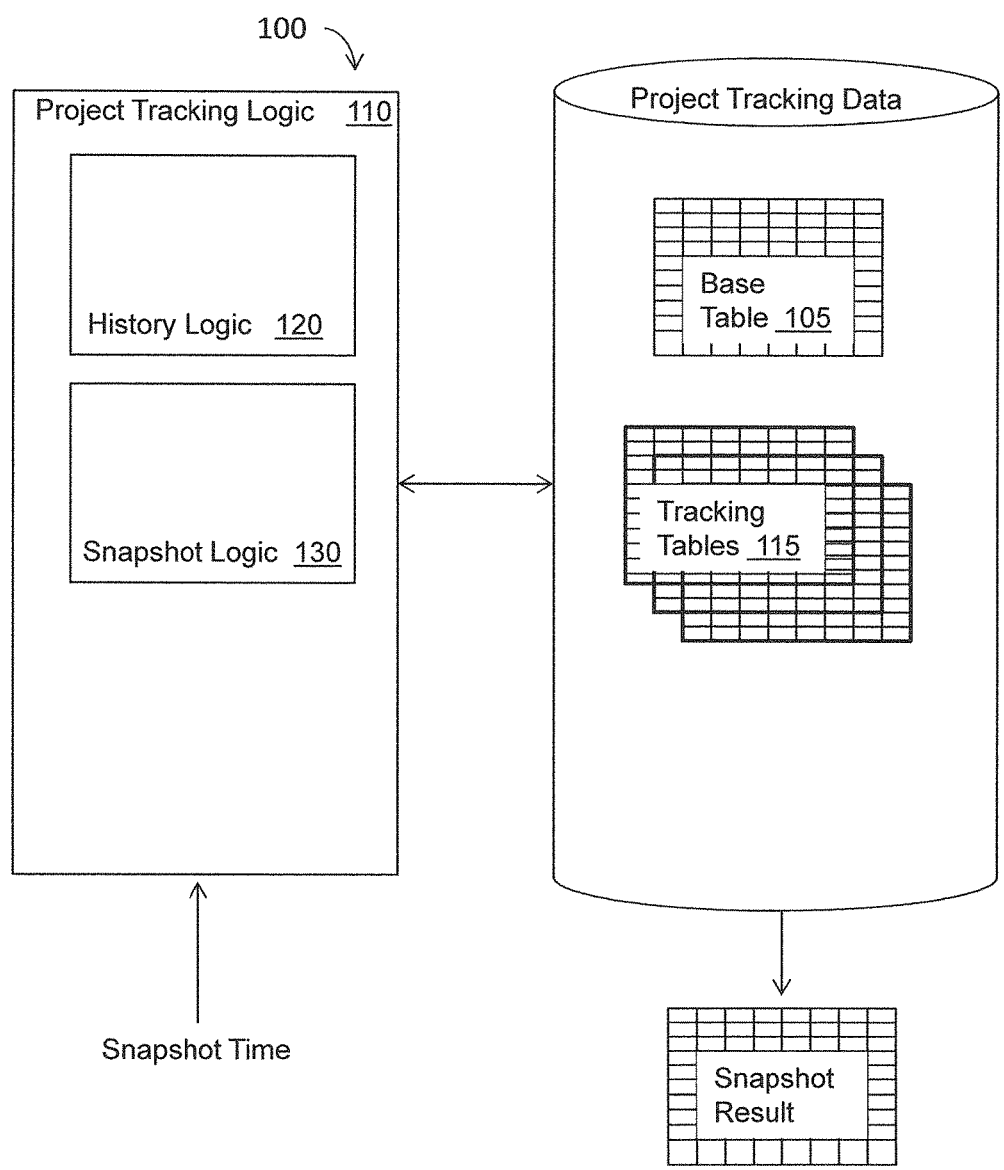
FIG. 1 illustrates one embodiment of a system associated with historical data tracking.

FIG. 1 illustrates one embodiment of project tracking system 100 that includes project tracking logic 110 configured to populate and access project tracking data to perform various analyses related to project tracking. Base project data may include, for example, records corresponding to various tasks that must be completed to complete a project. Each record may store a task status, projected start and end time, task cost, and so on for the task. As the project progresses, tasks are completed, start and end times are revised, and costs are updated. These changes are reflected by editing the base project data. The project tracking data includes at least one base table 105 that stores the current version of project data. For the purposes of this description tables are data structures configured to store records in corresponding rows. In a more general sense, project data may also encompass any set of data related to the same functional area. For example an employee base table may be maintained by human resources or payroll. Some of the examples that follow are in the context of an employee base table, but the principles of operation demonstrated in the examples are agnostic with respect to the type of data stored in the base table.

The project tracking logic 110 includes history logic 120 and snapshot logic 130. The history logic maintains one or more tracking 115 tables stored with the project tracking data. Snapshot logic 130 interacts with the tracking tables 115 along with the project's base table 105 to provide, on demand, a snapshot result that includes the values stored in the base table as of a given snapshot date.

Figure 2:
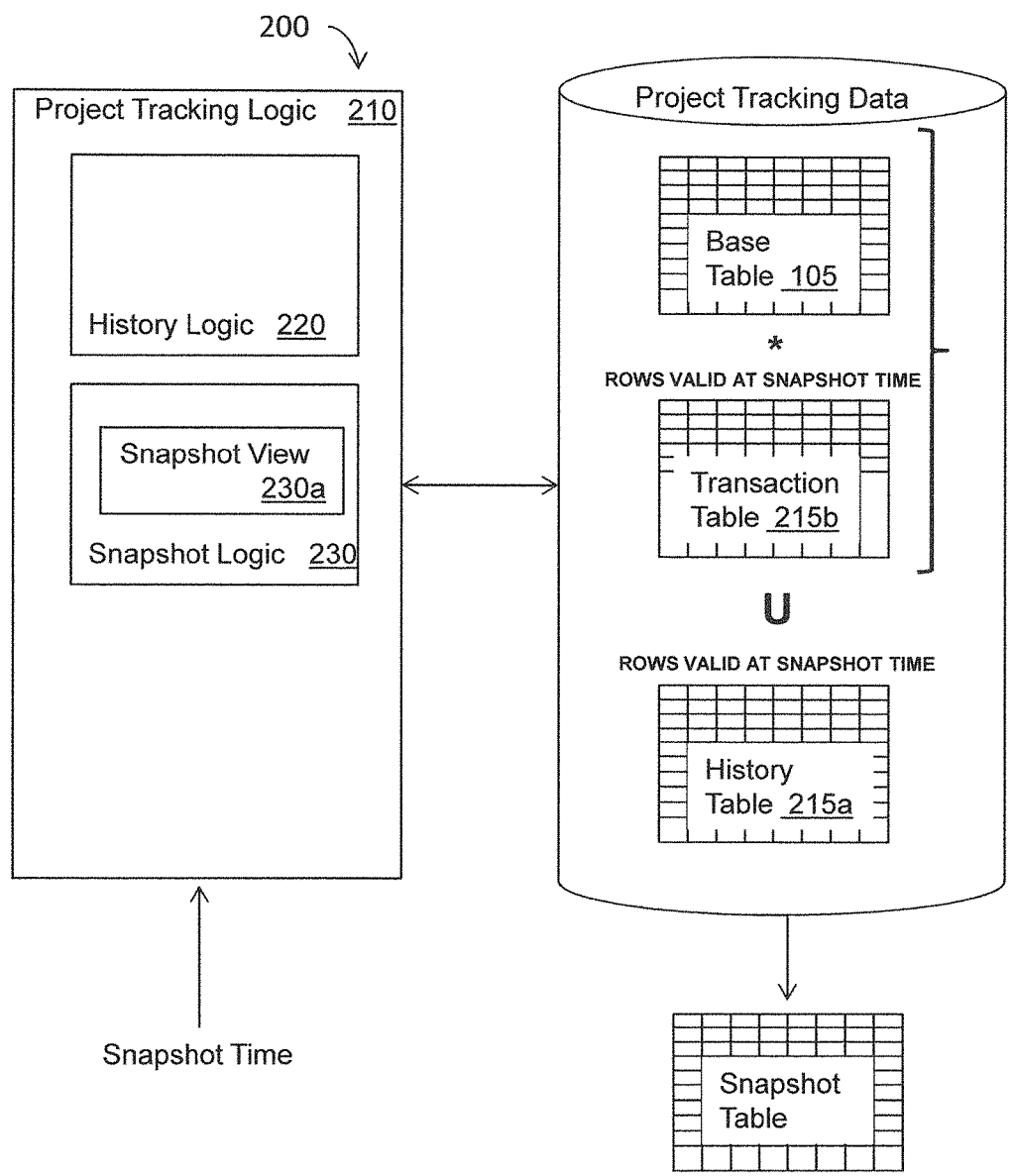
FIG. 2 illustrates one embodiment of a system associated with historical data tracking.

FIG. 2 illustrates on embodiment of a project tracking logic 210 that includes history logic 220 and snapshot logic 230. The history logic 220 maintains a history table 215a and a transaction table 215b that are examples of the tracking tables 115 of FIG. 1. The history table 215a has the same column structure as the base table 105 and is initially empty. For the purposes of this description each row in the base table 105 stores a "base record" that has a unique primary key (e.g. a unique identifier such as a row id in some databases). The terms "row in the base table 105" and "base record" are used interchangeably and are intended to have the same meaning.

As the base table 105 is updated, the history table 215a stores rows containing historical records. Each historical record corresponds to a prior version of a row in the base table 105 that is modified. In other words, when a row in the base table 105 is modified (e.g., updated or deleted), prior to the modification being made in the base table 105, the history logic 220 stores the base record in its present condition as a historical record in the history table 215a. If the base record is modified a second time, a second historical record will be stored in the history table 215a corresponding to the base record's condition prior to the second modification. The primary key for the base record links the base record to historical records corresponding to prior versions of the base record, if any, in the history table 215a. The terms "row in the history table" and "historical record" are used interchangeably and are intended to have the same meaning. Any base record in the base table 105 that has not been modified will not have any corresponding historical records in the history table 215a.

When a row is first added to the base table 105, no row is created in the history table 215a, however, the base table 105 stores a CREATE_TS timestamp for all rows that can be used to filter out "new" rows when a prior version of the base table 105 is being compiled as will be describe in more detail below. The history table 215a includes columns for a BEGIN_TS and an END_TS. The BEGIN_TS is the timestamp at which the row was first valid. The END_TS is the timestamp at which the row was last valid. Thus, the period between BEGIN_TS and END_TS defines a valid period time for the row during which this version of the row was actually present in the base table.

Because it can include a number of rows for each row that ever exists in the base table 105, over the course of a project the history table 215a can grow quite large. Thus it may be beneficial to partition the history table 215a. A partitioning scheme using time efficiently captures the expansion of the history table. Time is the axis of growth for the history table so it is appropriate that the history table be physically divided in a time-wise fashion.

In one embodiment, the history table is range partitioned on the END_TS column such that each partition includes rows with an END_TS less than a certain value. With range partitioning, there is generally some maximum value partition that includes rows that are not part of any other partition. For the history table, a single maximum value partition can be used at first, and as the history table grows, additional partitions can be created. Because the END_TS will always be populated with the current time when an update occurs, it is preferable, for partitioning purposes, to the BEGIN_TS which will depend on how recently the row was last updated.

The transaction table 215b includes a single transaction record for each base record in the base table 105 that has ever been modified (e.g., updated or deleted). The transaction table 215b is used by the snapshot logic 230 to determine whether a snapshot result should include, for a given primary key, the row from the base table 105 or a row from the history table 215a. The transaction table includes three columns, Row ID (which refers to a row or rows in the history table using the same primary key as the base table), BEGIN_TS, and END_TS. The terms "transaction record" and "row in the transaction table" are used interchangeably and are intended to have the same meaning.

There is at most only one row in the transaction table 215b for every row that was ever in the base table 105. Thus, when a base record is first modified, a corresponding transaction record is created in the transaction table 215b. The BEGIN_TS records the CREATE_TS timestamp for the base record from the base table 105. The END_TS records the timestamp when the base record was modified. Of course, at the same time, the unmodified version of the base record is stored in the history table 215a. When a base record is modified for a second time, the END_TS in the transaction table 215b is changed to correspond to the date of the second modification while the BEGIN_TS remains the same. Thus, it can be seen that the range between BEGIN_TS and END_TS in the transaction table 215b represents a time range when there is at least one historical record in the history table 215a for the given base record.

The following is an example of how the history logic 220 populates a history table called HT$EMP and a transaction table called HTX$EMP in response to modifications to a base table called EMP. The example begins with a new row for a new employee "Mason" being inserted into the EMP table. The record is created in the past by using the SET_CURRENT_DATE procedure to set the current time to May 14, 2013 (the date may also be implied from the current system date/time):

```
exec co_session.set_current_date(DATE '2013-05-14');
insert into emp
(empno, ename, job, mgr, hiredate, sal, comm, deptno)
values (9002,'MASON','QA',7788,DATE '2012-05-14',650,0,30)
/
commit;
```

As already discussed, no row is created in the HT$EMP or HTX$EMP table for this new insert. This is because the only version of the row is the one inserted in the base table EMP. Thus the tables HT$EMP and HTX$EMP are empty and the EMP base table includes the following base record:

| CREATE_TS | UPDATE_TS | EMPNO | ENAME | SAL | JOB |
|---|---|---|---|---|---|
| 05.14.2013 | 05.14.2013 | 9002 | MASON | 650 | QA |

Several days later on May 21, 2013 employee MASON gets a promotion and the base table EMP is updated as follows:

```
exec co_session.set_current_date(DATE '2013-05-21');
update emp set sal=670, job='QA2' where ename = 'MASON';
commit;
```

The base table EMP now includes the base record:

| CREATE_TS | UPDATE_TS | EMPNO | ENAME | SAL | JOB |
|---|---|---|---|---|---|
| 05.14.2013 | 05.21.2013 | 9002 | MASON | 670 | QA2 |

This is the first time a row storing a copy of the data for Mason is stored in the history table HT$EMP. Only saving the previous version of the row in the history table HT$EMP is necessary since the base table row has the current values for Mason. The history table HT$EMP now has the historical record:

| BEGIN_TS | END_TS | EMPNO | ENAME | SAL | JOB |
|---|---|---|---|---|---|
|  | 05.21.2013 | 9002 | MASON | 650 | QA |

The transaction table HTX$EMP now has the transaction record:

| EMPNO | HT$BEGIN_TS | HT$END_TS |
|---|---|---|
| 9002 | 05.14.2013 | 05.21.2013 |

Note that the old values for SAL (650) and JOB (QA) are stored in the new row in HT$EMP. These values were in effect until May 21, 2013. There is no need for a BEGIN_TS in the history table HT$EMP because the CREATE_TS of the row in the base table EMP indicates the earliest possible effective date for the record. The HTX$EMP table has (and always will have) only one row with a date/time range. This is the period of time for which there is a version of the row for Mason in the history table that should be used. If a snapshot result is requested for any time within that range, then a record for Mason will be pulled from HT$EMP table instead of the base table EMP.

Finally, there was a mistake in the salary (SAL) granted for the promotion. An update is made a week later on May 28, 2013 to correct this error:

```
exec co_session.set_current_date(DATE '2013-05-28');
update emp set sal=675 where ename = 'MASON';
commit;
```

The base table EMP now includes the base record:

| CREATE_TS | UPDATE_TS | EMPNO | ENAME | SAL | JOB |
|---|---|---|---|---|---|
| 05.14.2013 | 05.28.2013 | 9002 | MASON | 675 | QA2 |

Since this is a second update, a second row is added to HT$EMP (but not HTX$EMP). The history table HT$EMP now has the following two historical records:

| BEGIN_TS | END_TS | EMPNO | ENAME | SAL | JOB |
|---|---|---|---|---|---|
|  | 05.21.2013 | 9002 | MASON | 650 | QA |
| 05.21.2013 | 05.28.2013 | 9002 | MASON | 670 | QA |

The transaction table HTX$EMP now has the transaction record:

| EMP_NO | HT$BEGIN_TS | HT$END_TS |
|---|---|---|
| 9002 | 05.14.2013 | 05.28.2013 |

The additional row in HT$EMP has a BEGIN_TS value that corresponds to the END_TS of the previous historical record. The range of time in HTX$EMP has been extended to cover the newly added history record. It can be seen from the example that at any given time, one of the three rows (i.e., two in the history table and one in the base table) stored for Mason corresponds to the version of the record. The snapshot logic 230 includes a snapshot view 230a that selects which row to include in the snapshot result based on the date of the snapshot. When a snapshot table is sought for a snapshot date that falls within the range in the transaction table 215b for a given row, the snapshot table will include a row from the history table 215a instead of the row in the base table 105.

For simplicity, throughout this description the timestamp values are at a daily granularity. Of course, in many instances timestamp values have a much finer granularity, down to fractions of seconds. The level of granularity with which timestamps are handled does not affect the systems and methods described herein in any significant manner.

FIG. 2 illustrates the functionality of of one embodiment of a snapshot view 230a acting on the base table 105, the history table 215a, and the transaction table 215b to produce a "snapshot table" for the given date. For the purposes of this clarity, in this description a "view" is a query that, when executed on the project tracking data returns results that are sometimes cast as a "table." A query on the project tracking data may reference the view to use the table produced by the view as the source data, rather than the base table. A table that results from a view is generated on demand and may not be stored in the long term, making it different in some ways from a traditional table.

The snapshot view 230a combines selected rows from the base table 105 and the history table 215a using a Union operation. The snapshot view 230a performs a join operation between the base table 105 and the transaction table 215b to select base records in the base table 105 that do not have a historical record in the history table that is valid on the given date. The snapshot view 230a combines the selected base records with historical records in the history table that are valid on the given date to produce the snapshot table. In this manner, a snapshot table can be produced on demand for any instant in time, at the same level of granularity as the timestamp data. Any query that could be performed on the base table 105 can be instead performed on the snapshot table.

The following example illustrates a snapshot view V_EMP_FB that acts on the base table EMP, the history table HT$EMP, and the transaction table HTX$EMP from the earlier example to produce a snapshot at a given date. A first query selects from the base table 105 using the current time:

```
select ename, sal, job
from emp
where ename = 'MASON'
```

The result is the row from the base table showing the last update to set SAL=675 and JOB=QA2.

| ENAME | SAL | JOB |
|---|---|---|
| MASON | 675 | QA2 |

Next, using co_session.set_current_date, the snapshot view is used to flashback to May 15, 2013 to see what the data looked like then:

```
exec co_session.set_current_date(DATE '2013-5-15');
select ename, sal, job
from v_emp_fb
where ename = 'MASON'
```

The result is the row from the history table that was valid on May 15, 2013 and shows Mason's starting salary.

| ENAME | SAL | JOB |
|---|---|---|
| MASON | 650 | QA |

Below is the snapshot view called V_EMP_FB referenced by the above query:

```
select h.EMPNO, h.ENAME, h.JOB, h.MGR, h.HIREDATE, h.SAL,
h.COMM, h.DEPTNO, h.UPDATE_TS, h.UPDATE_USER,
h.CREATE_TS, h.CREATE_USER
from HT$EMP h
where ( ht$END_TS >= co_session.get_current_date_as_ts
and ( ht$BEGIN_TS < co_session.get_current_date_as_ts or
ht$BEGIN_TS is null)
```

-continued

```
and CREATE_TS <= co_session.get_current_date_as_ts)
union all
select /*+ index(htx HTX$EMP_I2) */ h.EMPNO, h.ENAME,
h.JOB, h.MGR, h.HIREDATE, h.SAL, h.COMM, h.DEPTNO,
h.UPDATE_TS, h.UPDATE_USER, h.CREATE_TS,
h.CREATE_USER
FROM EMP h left outer join HTX$EMP htx
ON h.rowid = chartorowid(ht$rid)
and co_session.get_current_date_as_ts between ht$BEGIN_TS
and ht$END_TS
where ht$rid is null
and CREATE_TS <= co_session.get_current_date_as_ts
```

Note the references to co_session.get_current_date_as_ts. This is how the value set in the procedure is used in the snapshot view. The snapshot view is always using the value of that function to determine the "When" of the results. The snapshot view has two distinct queries that are stitched together with a UNION ALL. Overall, the snapshot view will either pull from the base table (second query) or from historical data (first query). In the second query, the snapshot query will return rows from the base table unless either 1) the current_date is between the BEGIN_TS and END_TS of the HTX$ record (meaning there is a historical row available) or 2) the current_date is before the CREATE_TS of the record.

In the historical query (first query), rows are returned if the current_date is before the END_TS (but not before CREATE_TS) and after BEGIN_TS. The final result is a snapshot table that represents a consistent view of the base project data as it was at that time.

Figure 3:
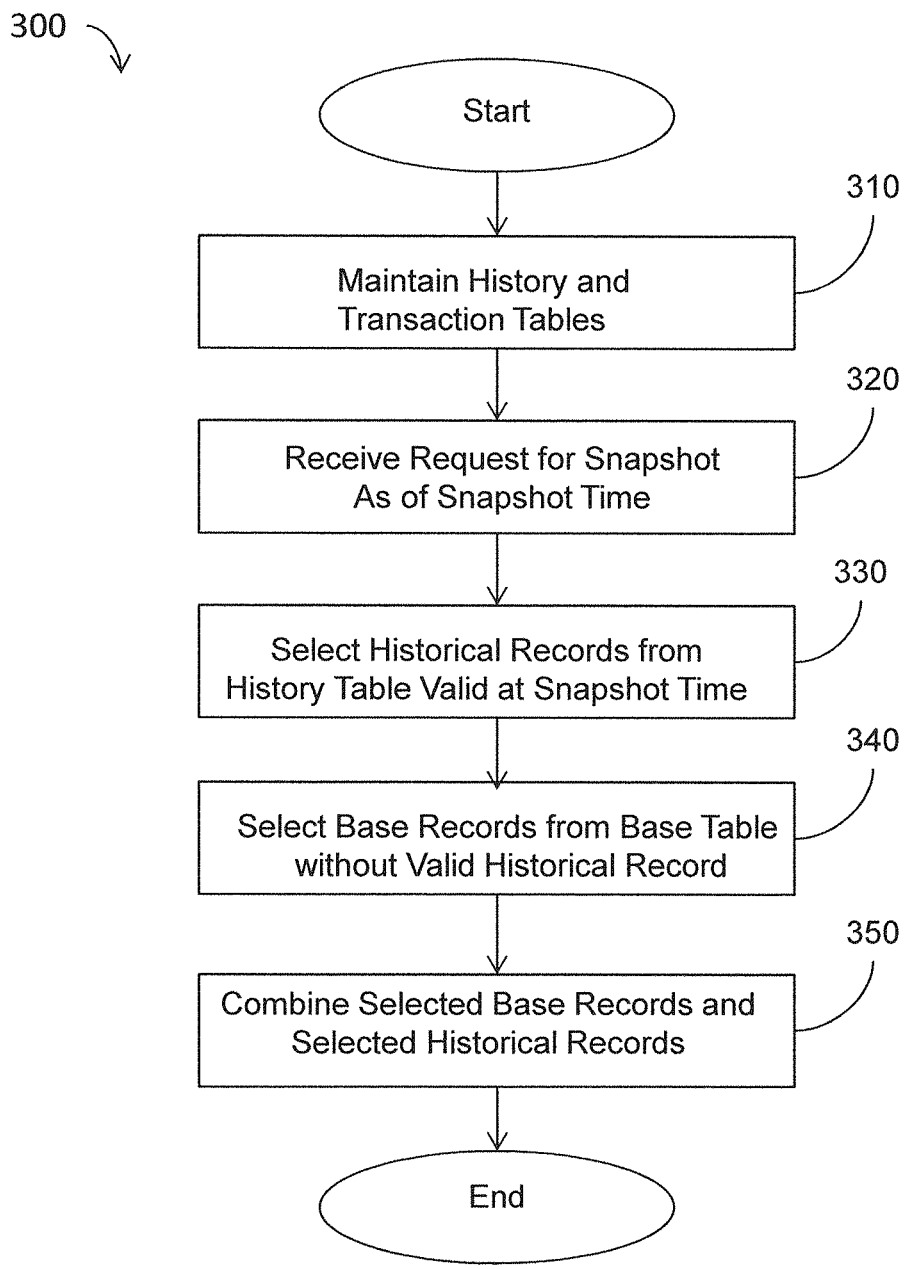
FIG. 3 illustrates one embodiment of a method associated with historical data tracking.

FIG. 3 illustrates one embodiment of a method 300 that is performed by the history logic 220 and/or the snapshot logic 230 of FIG. 2. The method 300 includes, at 310 maintaining a history table and a transaction table. The history table stores, for each record in project data that has ever been modified, at least one historical record that includes i) a version of the record prior modification and ii) a valid time range that defines a time during which the version of the record was valid. The transaction table stores, for each record in the project data that has ever been modified, a transaction record that includes historical time range that defines a time during which a historical record for the record is valid.

At 320 a request for a version of the project data as it existed at a snapshot time is received. The request may be received from a user entering a desired snapshot date and invoking a snapshot function (e.g., by specifying the snapshot view as source data). At 330, in response to the request, historical records are selected from the history table that have a valid time range that includes the snapshot time. At 340, base records are selected that do not have a transaction record in the transaction table with a history valid time that includes the snapshot time. At 350, the selected historical records and the selected base records are combined to create the scenario result. In one embodiment, steps 330-350 are performed by using a snapshot view (e.g., snapshot view 230a of FIG. 2).

What-if Scenarios

Figure 4:
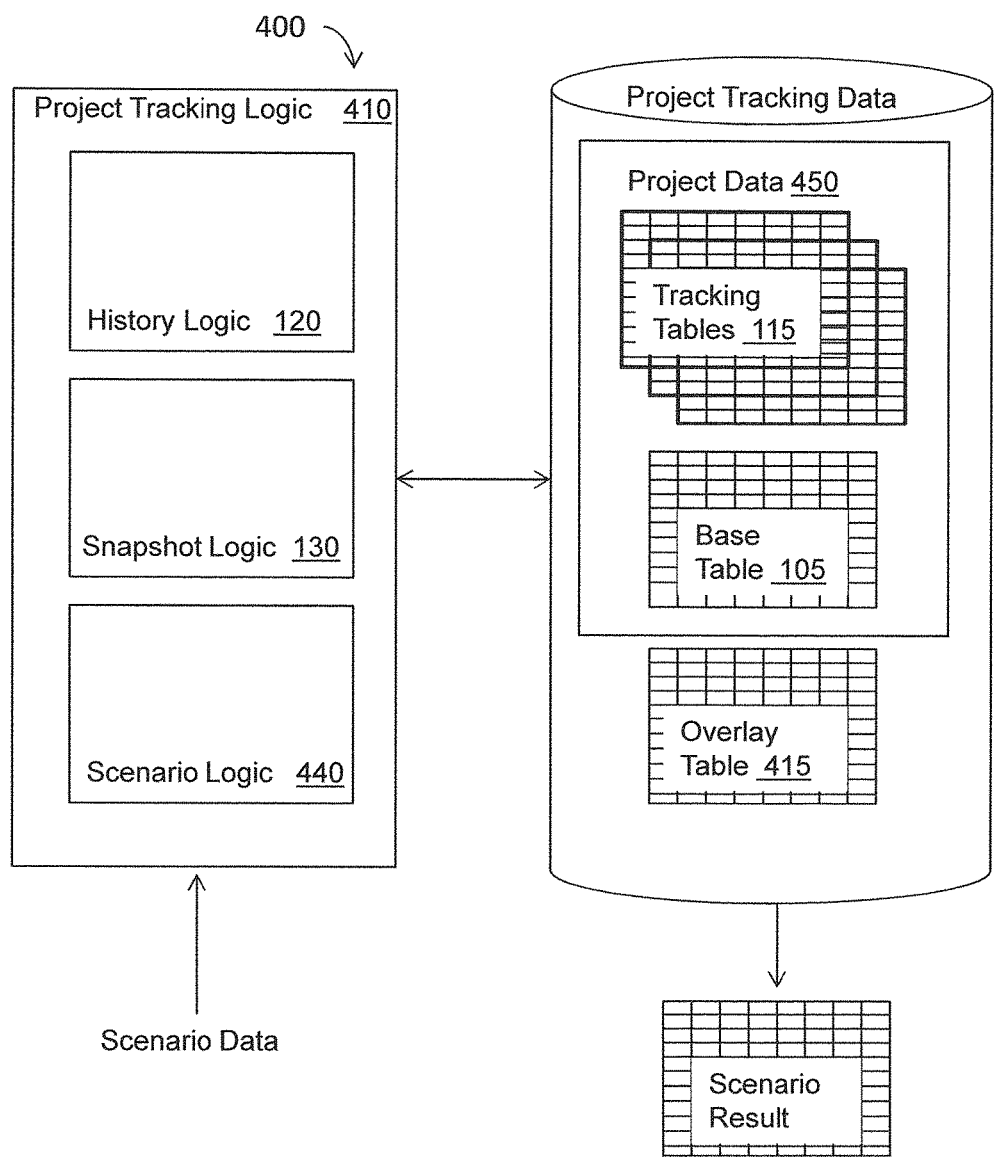
FIG. 4 illustrates one embodiment of a system associated with what-if scenario analysis.

FIG. 4 illustrates one embodiment of a project tracking system 400 that supports what-if scenario type analysis on project data 450. To perform scenario analysis, a user inputs scenario data that includes modifications to selected records in project data 450 and a scenario time that specifies a time at which the scenario should branch from the project data. The project data 450 includes the data stored in the base table 105 as updated, when appropriate, by the tracking tables 115 to retrieve a prior version of a base record that was valid at a scenario time.

The system 400 includes project tracking logic 410 with scenario logic 440 that allows a user to input the modifications to selected records in the project data 450. The scenario logic 440 is configured to record the resulting modified records in an overlay table 415, so that the selected records remain unmodified in the project data 450. In response to a request for the project data as modified by the scenario, the scenario logic 440 is configured to combine unmodified records in the project data and the modified records in the overlay table 415 to create a scenario result. In this manner the selected records in the project data 450 modified in the scenario are not included in the scenario result, but rather are replaced by their modified versions in the overlay table 415.

Figure 5:
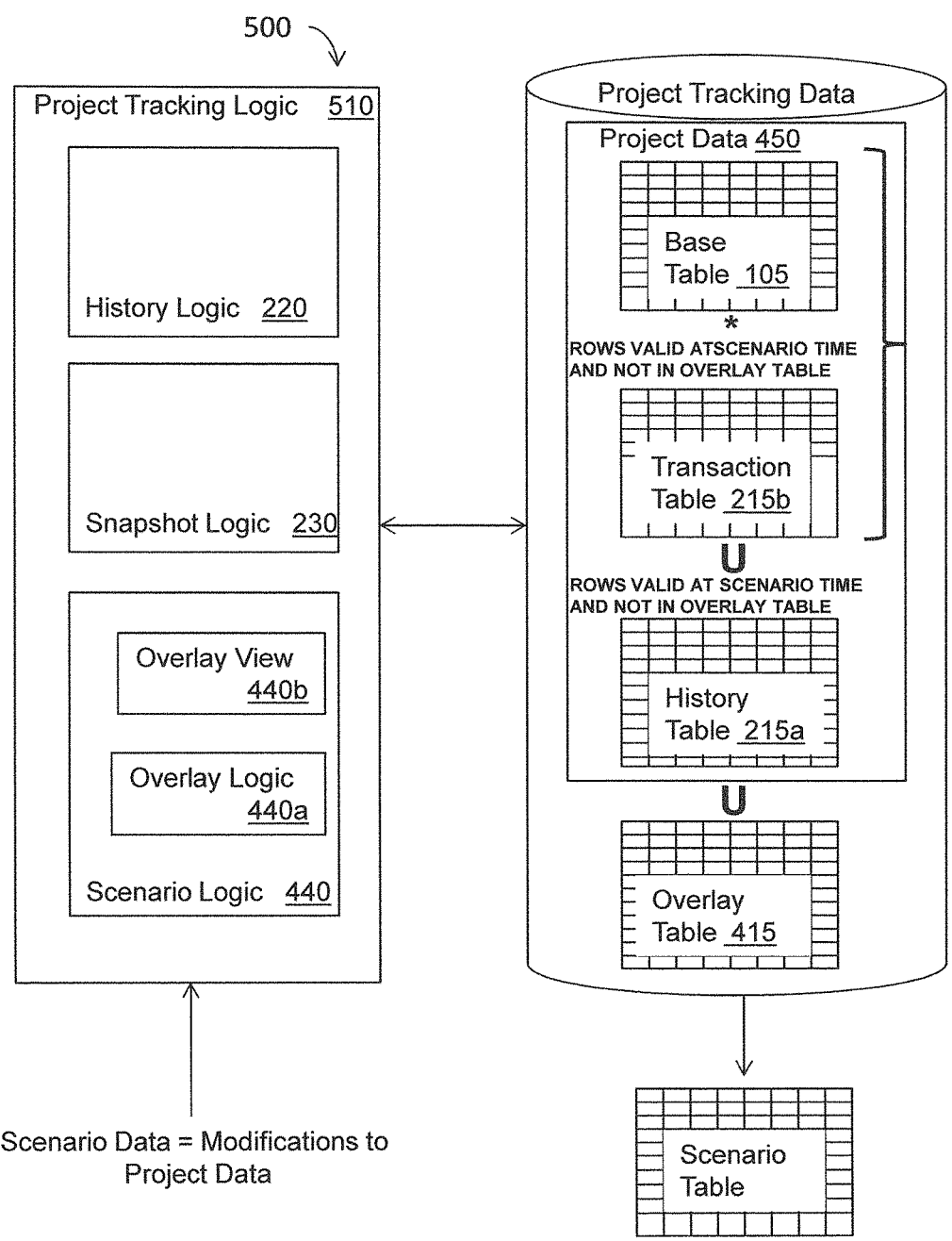
FIG. 5 illustrates one embodiment of a system associated with what-if scenario analysis.

FIG. 5 illustrates one embodiment of the scenario logic 440 that includes overlay logic 440a and an overlay view 440b. The overlay logic 440a maintains the overlay table 415 as will be described in more detail below. The overlay view 440b is an augmentation of the snapshot view 230a described above with the scenario time (called overlay_branch_time in the query) replacing snapshot_time. The function of the overlay view 440b is outlined in FIG. 5 using the bold U indicating UNION and * indicating join. When the overlay view 440b acts on the project data 450, a scenario table is produced that represents the project data as modified by the scenario.

The following SQL query, which includes three independent queries linked by UNION ALL commands, is the overlay view 440b. The portions in bold and underline are added to the snapshot query to prefer records in the overlay table to records in either the base table or the history table.

```
select ov.sys_overlay_id , h.EMPNO, h.ENAME, h.JOB,
h.MGR, h.HIREDATE, h.SAL, h.COMM, h.DEPTNO,
h.UPDATE_TS, h.UPDATE_USER, h.CREATE_TS,
h.CREATE_USER , 'HIST' ROW_TYPE
from HT$EMP h, sys_overlay ov
where ( h.ht$END_TS >= ov.overlay_branch_time
and ( h.ht$BEGIN_TS < ov.overlay_branch_time ))
and not exists (select * from OV$EMP_od
where od.EMPNO =h.EMPNO
and od.ovl$overlay_id =ov.sys_overlay_id )
union all
select /*+ index(htx HTX$EMP_I2) */ ov.sys_overlay_id
sys_overlay_id, b.EMPNO, b.ENAME, b.JOB, b.MGR,
b.HIREDATE, b.SAL, b.COMM, b.DEPTNO, b.UPDATE_TS,
b.UPDATE_USER, b.CREATE_TS, b.CREATE_USER, 'BASE'
ROW_TYPE
FROM EMP b full join sys_overlay ov ON 1=1
left outer join HTX$EMP htx
ON b.EMPNO = htx.EMPNO
and ov.overlay_branch_time between htx.ht$BEGIN_TS and
htx.ht$END_TS
where htx.EMPNO is null
and b.CREATE_TS <= ov.overlay_branch_time
and not exists (select * from OV$EMP_od
where od.EMPNO =b.EMPNO
and od.ovl$overlay_id =ov.sys_overlay_id )
union all
select ovl$overlay_id_sys_overlay_id,
o.EMPNO, o.ENAME, o.JOB, o.MGR, o.HIREDATE, o.SAL,
o.COMM, o.DEPTNO, o.UPDATE_TS, o.UPDATE_USER,
o.CREATE_TS, o.CREATE_USER
, 'OVER'ROW_TYPE
from OV$EMP_o
where o.OVL$TRANS in ('I','U')
```

The first query selects rows from the history table based on the OVERLAY_BRANCH_TIME (the timestamp representing the basis for the overlay). However, any primary key row found in the overlay table OV$EMP is excluded.

The second query selects any rows from the base table EMP that 1) do not have a row in the history table based on the transaction table HTX$ and 2) do not have a row in the overlay table OV$EMP either.

In the third query, rows are always selected from the overlay table OV$EMP. However, only rows for insert (I) and update (U) transactions are displayed. Transactions of type delete (D) are effectively excluded by this query.

Figure 6:
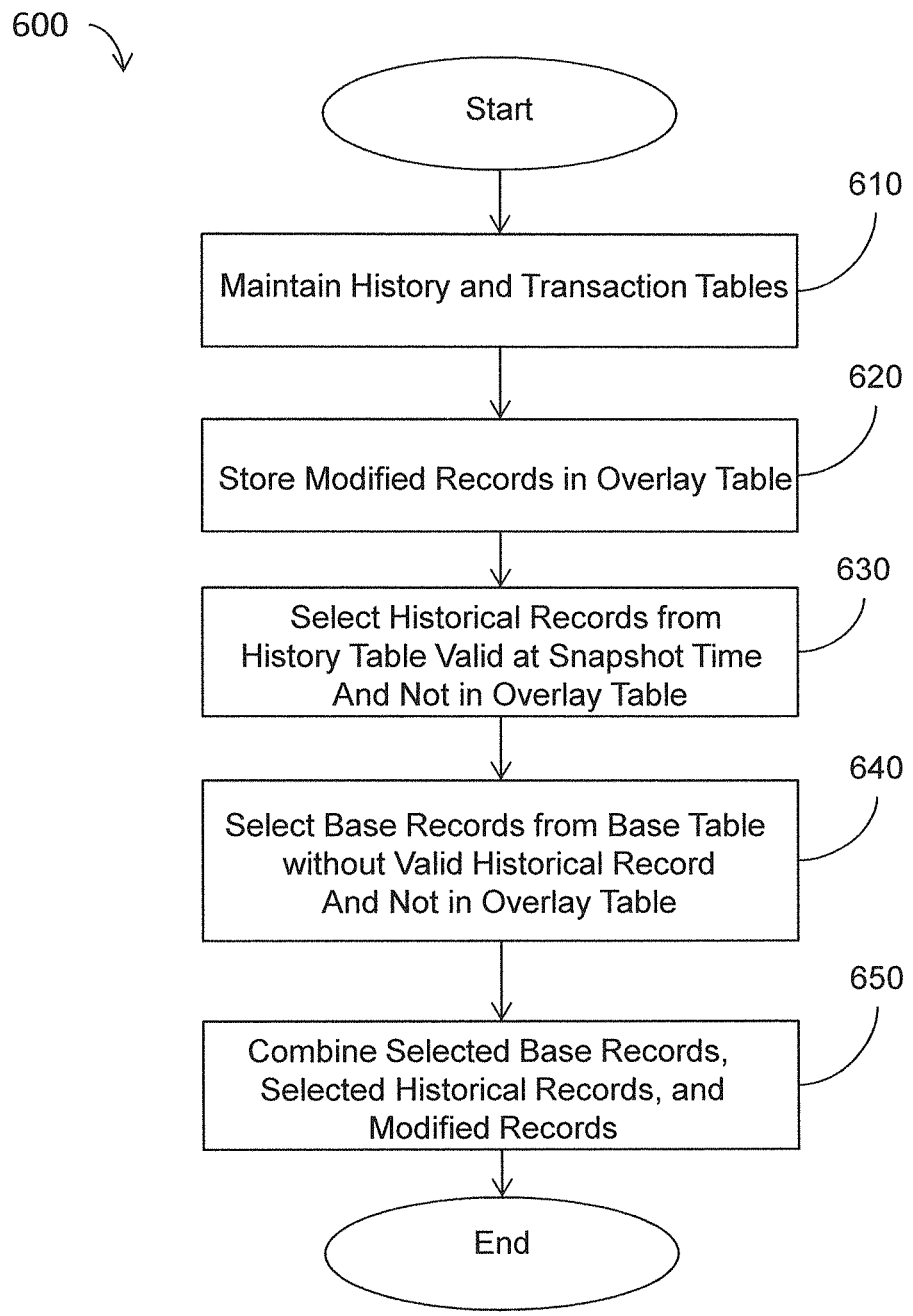
FIG. 6 illustrates one embodiment of a method associated with what-if scenario analysis.

FIG. 6 illustrates one embodiment of method 600 that may be performed by the project tracking logic 410 of FIG. 5 to provide a scenario feature. At 610, history and transaction tracking tables are maintained (e.g., by history logic 120). At 620, modified records that are the result of the scenario data entered by the user are stored in the overlay table (e.g., by overlay logic 440*a*). At 630, in response to a request for scenario results, historical records are selected from the history table that i) have a valid time range that includes the snapshot time time and ii) do not have corresponding modified records in the overlay table. At 640, base records are selected that i) do not have a transaction record in the transaction table with a history valid time that includes the scenario time and ii) do not have corresponding modified records in the overlay table. At 650, the selected historical records, the selected base records are combined with the modified records in the overlay table to create the scenario result. In one embodiment, steps 630-650 are performed by using an overlay view (e.g., overlay view 440*b* of FIG. 5).

Turning back to FIG. 5 and referring to the example, the base table EMP includes a key (EMPNO), employee name (ENAME), and salary (SAL). The base table looks like this:

| EMPNO | ENAME   | SAL |
|-------|---------|-----|
| 1001  | Rick    | 900 |
| 1002  | Hershel | 840 |
| 1003  | Daryl   | 890 |
| 1004  | Maggie  | 850 |

A user desires to perform a scenario called "2013 Salary What-if Analysis." The scenario has one new employee Glenn, one change to Daryl's salary and Hershel being fired. The overlay logic 440*a* assigns an overlay id=1 to this scenario and populates an overlay table, called OV$EMP to record the changes made in the scenario. Each modification made to the project data is classified as either an Update of an existing record, an Insert of a new record, or a Deletion of an existing record. Below are the contents of the overlay table 415 overlay id 1. Note that to avoid a physical database primary key violation, the primary keys for the base table and the overlay table are drawn from the same sequence of numbers.

| OV$OVERLAY_ID | OV$TRANS | EMPNO | ENAME | SAL |
|---------------|----------|-------|-------|-----|
| 1 | U | 1003 | Daryl | 910 |
| 1 | I | 1005 | Glenn | 850 |
| 1 | D | 1002 |       |     |

This is all that the overlay logic 440*a* stores in the overlay table 415 that supports the scenario 2013 Salary What-if Analysis. The scenario data in the overlay table 415 is queried via the overlay view V_EMP_OA, described above. The overlay view combines the data from the base table 105 with the data in the overlay table 415. The result produced by the view looks like an updated version of the base table EMP.

| EMPNO | ENAME  | SAL |
|-------|--------|-----|
| 1001  | Rick   | 900 |
| 1003  | Daryl  | 910 |
| 1004  | Maggie | 850 |
| 1005  | Glenn  | 850 |

The overlay logic 440*a* takes measures to address potential problems with data consistency and overlay tables. The overlay tables/scenario analysis feature is meant to be a bubble in which it is possible to modify, add, or remove data. Thus, within the scenario the data is only relationally and logically consistent for queries within the scenario such that business rules are enforced. If changes are still being made to project data during the scenario analysis, then including the changes made both to the project data and the scenario data could result in inconsistencies or instability.

In one embodiment, to address this problem, the overlay logic 440*a* uses the history table 215*a* as its branching point. Just like branching from the main trunk of a code repository, the scenario is branched from a point-in-time. The scenario feature provided by the scenario logic 440 and the snapshot feature provided by the snapshot logic 230 are thus linked. The branching is achieved by storing the branch time (i.e., the time at which the overlay table is first created) in a SYS_OVERLAY table that records metadata for each overlay in the overlay table. This names the overlay table and sets the branch time for each overlay in the table (normally the current time but could be set to any time desired). The column OVERLAY_BRANCH_TIME in the SYS_OVERLAY table is used to pull the correct records from the base table and tracking tables such as is done by the snapshot logic 230 (FIG. 2).

While it is possible, it is not advisable to simply update the branch time. Although this will not cause database errors it may cause unexpected data inconsistencies. An example of the problem would arise when a new employee Emily is added to an overlay table and then later added in the base table. This is a potential logical merge conflict and eventually would need to be resolved. The results would be the following:

The overlay table shows a consistent set of resources from the branch time.

| EMPNO | ENAME |
|-------|-------|
| 1 | Amanda |
| 2 | Jack |
| 3 | Nolan |
| 4 | Emily <- Added for scenario |

After the branch time, the base table is updated to include new employees Victoria and Emily so that the base table now includes:

| EMPNO | ENAME |
|-------|-------|
| 1 | Amanda |
| 2 | Jack |
| 3 | Nolan |

-continued

| EMPNO | ENAME |
|---|---|
| 5 | Victoria |
| 6 | Emily<– gets a different PK but is logically the same |
| 7 | Conrad |

Simply updating the OVERLAY_BRANCH_TIME to the current time will bring in all the records including the duplicates when the scenario is run:

| EMPNO | ENAME | |
|---|---|---|
| 1 | Amanda | |
| 2 | Jack | |
| 3 | Nolan | |
| 4 | Emily | <–from scenario |
| 5 | Victoria | |
| 6 | Emily | <– from project data |
| 7 | Conrad | |

Thus, care needs to be taken to avoid merges and resolve conflicts when working with what-if/scenarios via the overlay feature provided by the scenario logic 440. Updates in the project data should be merged with changes in the scenario data so that changes in the scenario data that have actually been made in the project data are either applied to or discarded from the scenario data.

Changing scenario data is distinctly different than changes to the project data in the base table 105 and tracking tables 115. While changing a the base table 105 is a simple insert/update/delete of rows in the base table that results in a historical record and transaction record being stored in the tracking tables 115, updating the overlay table 415 to reflect revised scenario data is not as straightforward. The overlay logic 440a allows scenario data to be modified as follows.

When the overlay logic 440a stores metadata in the SYS_OVERLAY table for a new scenario, there are no rows yet for the newly created scenario in the overlay table. All the data in the scenario result is coming directly from project data (e.g., the base table when the scenario time is set to be the current time). Data is populated in the overlay table 415 on a copy-on-update basis, so the records in the overlay table are created when the first update is made.

The following SQL command will create an overlay table:

```
insert into sys_overlay (SYS_OVERLAY_ID,
OVERLAY_SHORT_NAME, OVERLAY_NAME,
OVERLAY_BRANCH_TIME)
values ( sys_overlay_seq.nextval, 'OVB1', 'Example
Overlay B1', sysdate)
```

After this command there are no records in the overlay table, but there are records in the scenario result (i.e., the records selected by the overlay view 440b):

| EMPNO | ENAME | SAL |
|---|---|---|
| 1001 | Rick | 900 |
| 1003 | Daryl | 890 |
| 1004 | Maggie | 850 |
| 1005 | Glenn | 850 |

The overlay view V_EMP_OA is the key to updating scenario data in the overlay table 415. In one embodiment, INSTEAD-OF triggers are used by the overlay logic 440a to update the overlay table 415 when changes are made to scenario data stored in the overlay table 415. INSTEAD-OF Trigger are a way of allowing updates to be made in complex views. The INSTEAD-OF trigger overrides the insert/update/delete operations on a specified view. This allows for the addition of custom database procedural code (e.g., PL/SQL code) that specifies a different operation or operations that should be performed instead of the original operation.

The overlay logic 440a includes an INSTEAD-OF trigger for each operation (insert/update/delete) performed on the scenario result. In this trigger code the overlay logic 440a first checks for an existing record in the overlay table. If the record is already in the overlay table 415, then the operation is performed on that row. If the record is not in the overlay table 415, the trigger is used to insert a new row in the overlay table. This is even true for DELETE operations since a row is used to store the record that represents the record as being deleted. There are three triggers on the overlay view, one for an UPDATE operation, one for an INSERT operation, and one for a DELETE operation.

Here is the UPDATE trigger on the overlay view for the EMP table (e.g., the scenario result). Notice that this trigger is valid for either an insert or an update depending on the existence of a row in OV$EMP overlay table for the given primary key (or row identifier).

| TRIGGER_BODY |
|---|
| DECLARE |
| vcnt pls_integer; |
| BEGIN |
| SELECT COUNT(*) |
| INTO vcnt |
| FROM OV$EMP |
| WHERE OVL$OVERLAY_ID = :NEW.SYS_OVERLAY_ID |
| and EMPNO = :new.EMPNO; |
| IF vcnt = 0 THEN |
| INSERT INTO OV$EMP |
| (OVL$OVERLAY_ID, ovl$trans, ovl$create_ts, |
| ovl$update_ts |
| , EMPNO,ENAME,JOB,MGR,HIREDATE,SAL,COMM,DEPTNO) |
| VALUES |
| (:NEW.SYS_OVERLAY_ID,'U', current_timestamp, |
| current_timestamp |
| ,:new.EMPNO,:new.ENAME,:new.JOB,:new.MGR,:new.HIREDATE |
| ,:new.SAL,:new.COMM, |
| :new.DEPTNO); |
| ELSE |
| update OV$EMP |
| set ovl$trans = decode(ovl$trans, 'I','I','U'), |
| ovl$update_ts=current_timest |
| amp ,EMPNO = :new.EMPNO,ENAME = :new.ENAME,JOB = |
| :new.JOB,MGR = :new.MGR,HIREDAT |
| E = :new.HIREDATE,SAL = :new.SAL,COMM = |
| :new.COMM,DEPTNO = :new.DEPTNO |
| where OVL$OVERLAY_ID = :NEW.SYS_OVERLAY_ID |
| and EMPNO = :new.EMPNO; |
| END IF; |
| END v_EMP_oau; |

The general rule is that DML operations on scenario data must be done against the scenario results view and not the project base table data. Here are some example DML operations.

The following SQL command inserts a new employee, Carol, into the scenario. Note the use of the emp_seq sequence which assigns the next available employee number to the proposed new employee.

```
insert into v_EMP_oa (sys_overlay_id, empno, ename)
values ( 1, emp_seq.nextval, 'Carol');
```

The following SQL command changes Rick's salary just in the scenario:

```
update v_EMP_oa set sal = 910 where ename = 'Rick' and
sys_overlay_id =1;
```

Figure 7:
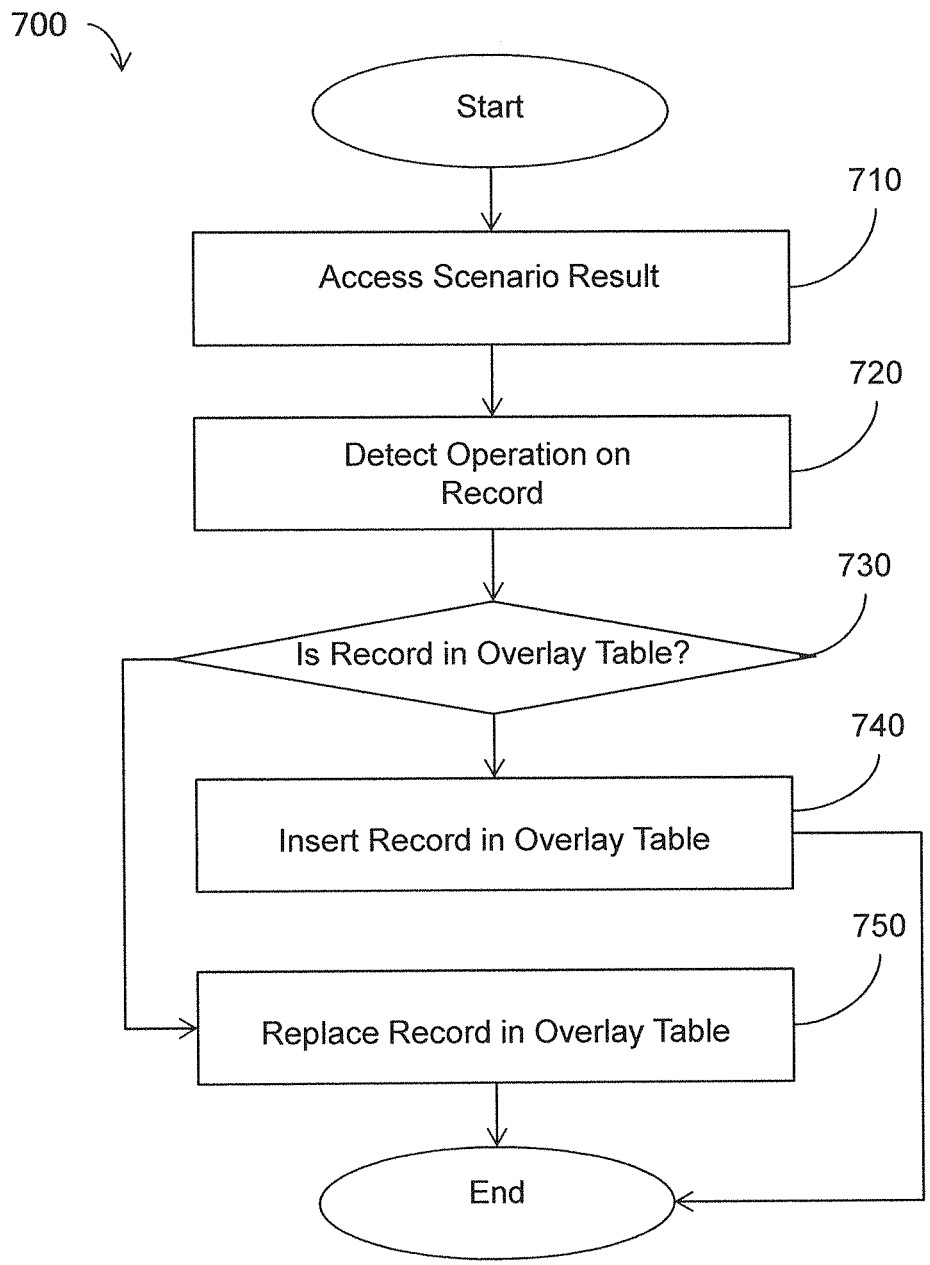
FIG. 7 illustrates one embodiment of a method associated with maintaining an overlay table to support what-if scenario analysis.

The following SQL command fires anyone making less than 860 in the scenario:

delete from v_EMP_oa where sal<860;

FIG. 7 illustrates one embodiment of a method 700 that may be performed by the overlay logic 440a of FIG. 5 to properly record modified records in a scenario in the overlay table 415. At 710 the scenario result is accessed by a user seeking to modify the scenario. The scenario result may be a scenario table that is the result of a scenario view operating on project data. At 720, an operation on a record in the scenario result is detected. The operation may be detected when a user enters a new record, modifies an existing record, or deletes a record from an overlay table. At 730, a determination is made as to whether the record being modified is already in the overlay table. At 740, if the record is not already in the overlay table, the record, as modified, is inserted into the overlay table. At 750, if the record is already in the overlay table the record in the overlay table is replaced with the modified record. In one embodiment, steps 720-750 are performed using the INSTEAD-OF triggers described above.

It can be seen from the foregoing description that the systems and methods described herein provide project progress management including what-if scenario analysis without relying on stored snapshots. Rather than storing multiple snapshots that correspond to each what-if scenario, the systems and methods herein maintain a few project tracking tables and provide an overlay view that accesses the base table and the tracking to support the scenario analysis.

In one embodiment, the project tracking systems described in FIGS. 1, 2, 4, and 5 are computing/data processing systems including an application or collection of distributed applications for enterprise organizations. The applications and computing systems may be configured to operate with or be implemented as a cloud-based networking system, a software as a service (SaaS) architecture, or other type of networked computing solution. In one embodiment the project tracking logic is a centralized server-side application that provides at least the functions disclosed herein and that is accessed by many users via computing devices/terminals communicating with the project tracking logic (functioning as the server) over a computer network.

Computing Device Embodiment

Figure 8:
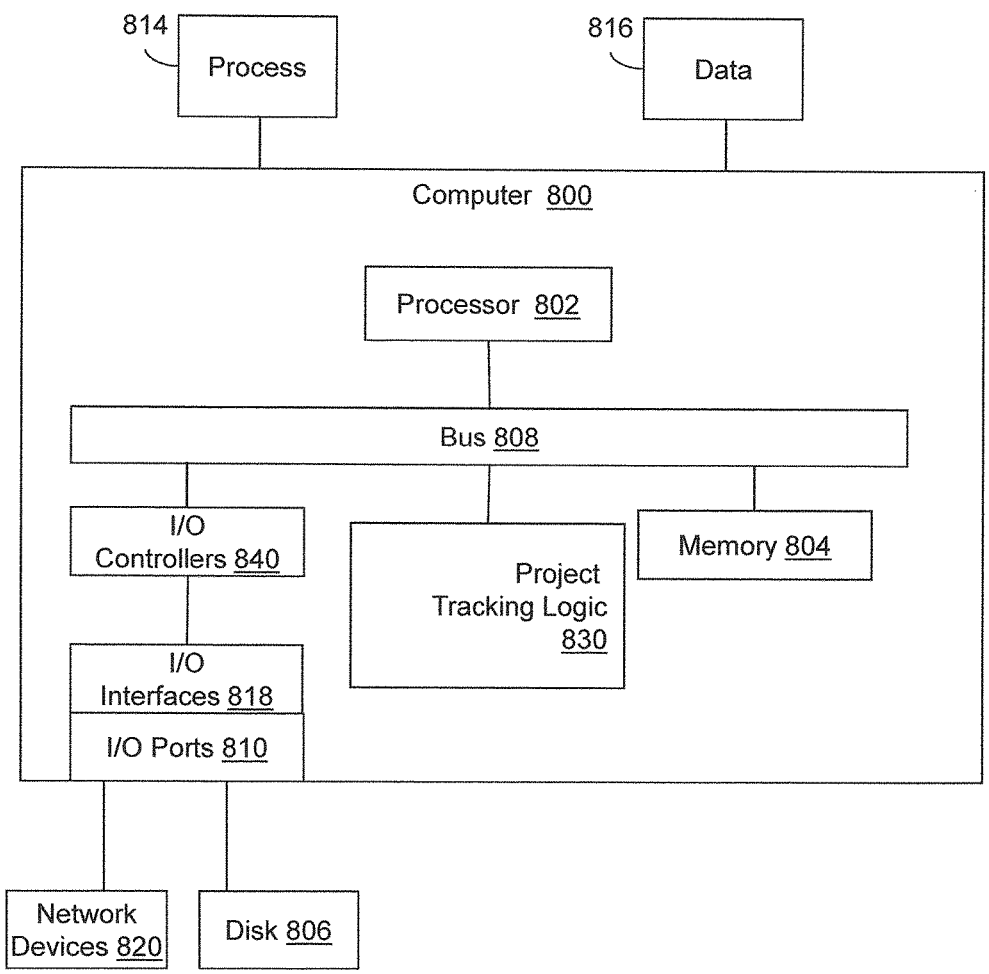
FIG. 8 illustrates an embodiment of a computing system configured with the example systems and/or methods disclosed.

FIG. 8 illustrates an example computing device that is configured and/or programmed with one or more of the example systems and methods described herein, and/or equivalents. The example computing device may be a computer 800 that includes a processor 802, a memory 804, and input/output ports 810 operably connected by a bus 808. In one example, the computer 800 may include project tracking logic 830 configured to facilitate project tracking using views and tracking tables in a manner similar to project tracking logic 110, 210, 410, and 510 shown in FIGS. 1, 2, 4, and 5, respectively. In different examples, the logic 830 may be implemented in hardware, a non-transitory computer-readable medium with stored instructions, firmware, and/or combinations thereof. While the logic 830 is illustrated as a hardware component attached to the bus 808, it is to be appreciated that in other embodiments, the logic 830 could be implemented in the processor 802, stored in memory 804, or stored in disk 806.

In one embodiment, logic 830 or the computer is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to perform scenario analysis using views, tracking tables, and an overlay table. The means may also be implemented as stored computer executable instructions that are presented to computer 800 as data 816 that are temporarily stored in memory 804 and then executed by processor 802.

Logic 830 may also provide means (e.g., hardware, non-transitory computer-readable medium that stores executable instructions, firmware) for performing scenario analysis using views, tracking tables, and an overlay table.

Generally describing an example configuration of the computer 800, the processor 802 may be a variety of various processors including dual microprocessor and other multi-processor architectures. A memory 804 may include volatile memory and/or non-volatile memory. Non-volatile memory may include, for example, ROM, PROM, and so on. Volatile memory may include, for example, RAM, SRAM, DRAM, and so on.

A storage disk 806 may be operably connected to the computer 800 via, for example, an input/output interface (e.g., card, device) 818 and an input/output port 810. The disk 806 may be, for example, a magnetic disk drive, a solid state disk drive, a floppy disk drive, a tape drive, a Zip drive, a flash memory card, a memory stick, and so on. Furthermore, the disk 806 may be a CD-ROM drive, a CD-R drive, a CD-RW drive, a DVD ROM, and so on. The memory 804 can store a process 814 and/or a data 816, for example. The disk 806 and/or the memory 804 can store an operating system that controls and allocates resources of the computer 800.

The computer 800 may interact with input/output devices via the i/o interfaces 818 and the input/output ports 810. Input/output devices may be, for example, a keyboard, a microphone, a pointing and selection device, cameras, video cards, displays, the disk 806, the network devices 820, and so on. The input/output ports 810 may include, for example, serial ports, parallel ports, and USB ports.

The computer 800 can operate in a network environment and thus may be connected to the network devices 820 via the i/o interfaces 818, and/or the i/o ports 810. Through the network devices 820, the computer 800 may interact with a network. Through the network, the computer 800 may be logically connected to remote computers. Networks with which the computer 800 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
OQL: object query language.
USB: universal serial bus.
XML: extensible markup language.
WAN: wide area network.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C § 101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. § 101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer storage medium storing computer-executable instructions that when executed by at least a processor of a computer cause the computer to:
   receive, by at least the processor, input scenario data comprising modifications to records in project data, wherein the modifications are associated with a scenario;
   in response to receiving the input scenario data, (i) generate, by at least the processor, modified records based on the modifications and the records in the project data, and (ii) record, by at least the processor, the modified records in an overlay table, wherein the modified records are generated and recorded in the overlay table without modifying the records in the project data;
   receive, by at least the processor, a request for the project data as modified by the scenario; and
   in response to receiving the request, generate, by at least the processor, a scenario result based upon a combination of one or more records in the project data with the modified records in the overlay table, wherein the scenario result includes the modified records in the overlay table and does not include the records in the project data for which the input scenario data provided for modifying.

2. The non-transitory computer storage medium of claim 1, where the instructions cause the computer to:
   record, for each modified record in the overlay table, a classification of i) insert, ii) update, or iii) delete based on an operation performed on a corresponding record to produce the modified record; and
   in response to the request:
     identify modified records in the overlay table classified as either an insert or an update; and
     combine the identified modified records with the unmodified records to produce the scenario result, such that modified records classified as delete are not included in the scenario result.

3. The non-transitory computer storage medium of claim 1, where the instructions cause the computer to:
   record, in overlay metadata for the scenario, a scenario time that specifies an effective time for the scenario; and
   in response to the request, generate the scenario result by:
     identifying a version of at least one record, in the project data, that was valid at the scenario time; and
     combining the identified version of the at least one record with the modified records.

4. The non-transitory computer storage medium of claim 3, where the generating the scenario result comprises:
   maintaining a history table that stores, for each record in the project data that has been modified, at least one corresponding historical record that includes i) a version of the record prior to modification and ii) a valid time range that defines a time during which the version of the record was valid;
   maintaining a transaction table that stores, for each record in the project data that has been modified, a corresponding transaction record that includes a historical time range that defines a time during which a historical record for the record is valid; and
   executing an overlay view on the history table, the transaction table, and a base table that stores base records corresponding to a current version of the records in the project data, where the overlay view is configured to:
     select historical records in the history table that i) have a valid time range that includes the scenario time and ii) do not have a corresponding modified record in the overlay table;
     select base records from the base table that i) do not have a corresponding transaction record with a history valid time that includes the scenario time and ii) do not have a corresponding modified record in the overlay table; and
     combine the modified records, the selected historical records, and the selected base records to generate the scenario result.

5. The non-transitory computer storage medium of claim 1, where the instructions cause the computer to revise the overlay table by:
   detecting an operation on a record associated with the scenario result;
   determining if the record is a modified record in the overlay table, and
     when the record is not a modified record in the overlay table, inserting the record as a modified record in the overlay table;
     when the record is a modified record in the overlay table, replacing the modified record with a record that results from execution of the operation.

6. The non-transitory computer storage medium of claim 5, where the instructions cause the computer to:
   determine a classification of the operation;
   select an instead-of trigger mapped to the classification, where the instead-of trigger comprises instructions that, when executed, update the overlay view; and
   execute the selected trigger to modify the overlay table.

7. The non-transitory computer storage medium of claim 1, where the instructions cause the computer to:
   record a second scenario comprising a second set of modified records in the overlay table; and
   in response to a request for the project data as modified by the second scenario, combine records in the project data with the second set of modified records in the overlay table to create a second scenario result.

8. A computing system, comprising:
   computer readable storage media configured to store project data and an overlay table; and
   scenario logic configured to:
     receive input scenario data comprising modifications to records in project data, wherein the modifications are associated with a scenario;
     in response to receiving the input scenario data, (i) generate modified records based on the modifications and the records in the project data, and (ii)

record the modified records in an overlay table, wherein the modified records are generated and recorded in the overlay table without modifying the records in the project data;

receive a request for the project data as modified by the scenario; and in response to receiving the request, generate a scenario result based upon a combination of one or more records in the project data with the modified records in the overlay table, wherein the scenario result includes the modified records in the overlay table and does not include the records in the project data for which the input scenario data provided for modifying.

9. The computing system of claim 8, where the scenario logic is further configured to:

record, for each modified record in the overlay table, a classification of i) insert, ii) update, or iii) delete based on the operation performed on a corresponding record to produce the modified record; and in response to the request:
identify modified records in the overlay table classified as either an insert or an update; and
combine the identified modified records with the unmodified records to produce the scenario result, such that modified records classified as delete are not included in the scenario result.

10. The computing system of claim 8, where the scenario logic is further configured to:

record, in overlay metadata, a scenario time that specifies an effective time for the scenario; and in response to the request, generate the scenario result by:
identifying a version of at least one record, in the project data, that was valid at the scenario time; and
combining the identified version of the at least one record with the modified records.

11. The computing system of claim 10, further comprising:

history logic configured to maintain:
a history table that stores, for each record in the project data that has been modified, at least one corresponding historical record that includes i) a version of the record prior to modification and ii) a valid time range that defines a time during which the version of the record was valid; and
a transaction table that stores, for each record in the project data that has been modified, a corresponding transaction record that includes a historical time range that defines a time during which a historical record for the record is valid; and where the scenario logic is further configured to create the scenario result by:
executing an overlay view on the history table, the transaction table, and a base table that stores base records corresponding to a current version of the records in the project data, where the overlay view is configured to:
select historical records in the history table that i) have a valid time range that includes the scenario time and ii) do not have a corresponding modified record in the overlay table;
select base records from the base table that i) do not have a corresponding transaction record with a history valid time that includes the scenario time and ii) do not have a corresponding modified record in the overlay table; and combine the modified records, the selected historical records, and the selected base records to generate the scenario result.

12. The computing system of claim 8, where the scenario logic is further configured to revise the overlay table by:

detecting an operation on a record associated with the scenario result;

determining if the record is a modified record in the overlay table, and
when the record is not a modified record in the overlay table, inserting the record as a modified record in the overlay table;
when the record is a modified record in the overlay table, replacing the modified record with a record that results from execution of the operation.

13. The computing system of claim 12, where the scenario logic is further configured to:

determine a classification of the operation;

select an instead-of trigger mapped to the classification, where the instead-of trigger comprises instructions that, when executed, update the overlay view; and execute the selected trigger to modify the overlay table.

14. A computer-implemented method comprising, with a processor:

receiving input scenario data comprising modifications to records in project data, wherein the modifications are associated with a scenario;

in response to receiving the input scenario data, (i) generating modified records based on the modifications and the records in the project data, and (ii) recording the modified records in an overlay table, wherein the modified records are generated and recorded in the overlay table without modifying the records in the project data;

receiving a request for the project data as modified by the scenario; and in response to receiving the request, generating a scenario result based upon a combination of one or more records in the project data with the modified records in the overlay table, wherein the scenario result includes the modified records in the overlay table and does not include the records in the project data for which the input scenario data provided for modifying.

15. The computer-implemented method of claim 14, further comprising, with a processor:

recording, for each modified record in the overlay table, a classification of i) insert, ii) update, or iii) delete based on the operation performed on a corresponding record to produce the modified record; and in response to the request:
identifying modified records in the overlay table classified as either an insert or an update; and
combining the identified modified records with the unmodified records to produce the scenario result, such that modified records classified as delete are not included in the scenario result.

16. The computer-implemented method of claim 14, further comprising, with a processor:

recording, in overlay metadata, a scenario time that specifies an effective time for the scenario; and in response to the request, generating the scenario result by:
identifying a version of at least one record, in the project data, that was valid at the scenario time; and
combining the identified version of the at least one record with the modified records.

17. The computer-implemented method of claim 16, further comprising, with a processor, creating the scenario result by:
maintaining a history table that stores, for each record in the project data that has been modified, at least one corresponding historical record that includes i) a version of the record prior to modification and ii) a valid time range that defines a time during which the version of the record was valid;
maintaining a transaction table that stores, for each record in the project data that has been modified, a corresponding transaction record that includes a historical time range that defines a time during which a historical record for the record is valid; and
executing an overlay view on the history table, the transaction table, and a base table that stores base records corresponding to a current version of the records in the project data, where the overlay view is configured to:
select historical records in the history table that i) have a valid time range that includes the scenario time and ii) do not have a corresponding modified record in the overlay table;
select base records from the base table that i) do not have a corresponding transaction record with a history valid time that includes the scenario time and ii) do not have a corresponding modified record in the overlay table; and
combine the modified records, the selected historical records, and the selected base records to generate the scenario result.

18. The computer-implemented method of claim 14, further comprising, with a processor, revising the overlay table by:
detecting an operation on a record associated with the scenario result;
determining if the record is a modified record in the overlay table, and
when the record is not a modified record in the overlay table, inserting the record as a modified record in the overlay table;
when the record is a modified record in the overlay table, replacing the modified record with a record that results from execution of the operation.

19. The computer-implemented method of claim 18, where the method further comprises, with a processor:
determining a classification of the operation;
selecting an instead-of trigger mapped to the classification, where the instead-of trigger comprises instructions that, when executed, update the overlay view; and
executing the selected trigger to modify the overlay table.

20. The computer-implemented method of claim 14, further comprising, with a processor:
recording a second scenario comprising a second set of modified records in the overlay table; and
in response to a request for the project data as modified by the second scenario, combining records in the project data with the second set of modified records in the overlay table to create a second scenario result.

* * * * *

UNITED STATES PATENT AND TRADEMARK OFFICE
CERTIFICATE OF CORRECTION

PATENT NO. : 10,127,252 B2
APPLICATION NO. : 14/710771
DATED : November 13, 2018
INVENTOR(S) : Diehl Page 1 of 1

It is certified that error appears in the above-identified patent and that said Letters Patent is hereby corrected as shown below:

In the Specification

In Column 5, Line 61, delete "of of" and insert -- of --, therefor.

In Column 9, Line 21, delete "time time" and insert -- time --, therefor.

In Column 11, Line 31, delete "a the" and insert -- the --, therefor.

Signed and Sealed this
Fifth Day of November, 2019

Andrei Iancu
*Director of the United States Patent and Trademark Office*